Patented Mar. 30, 1943

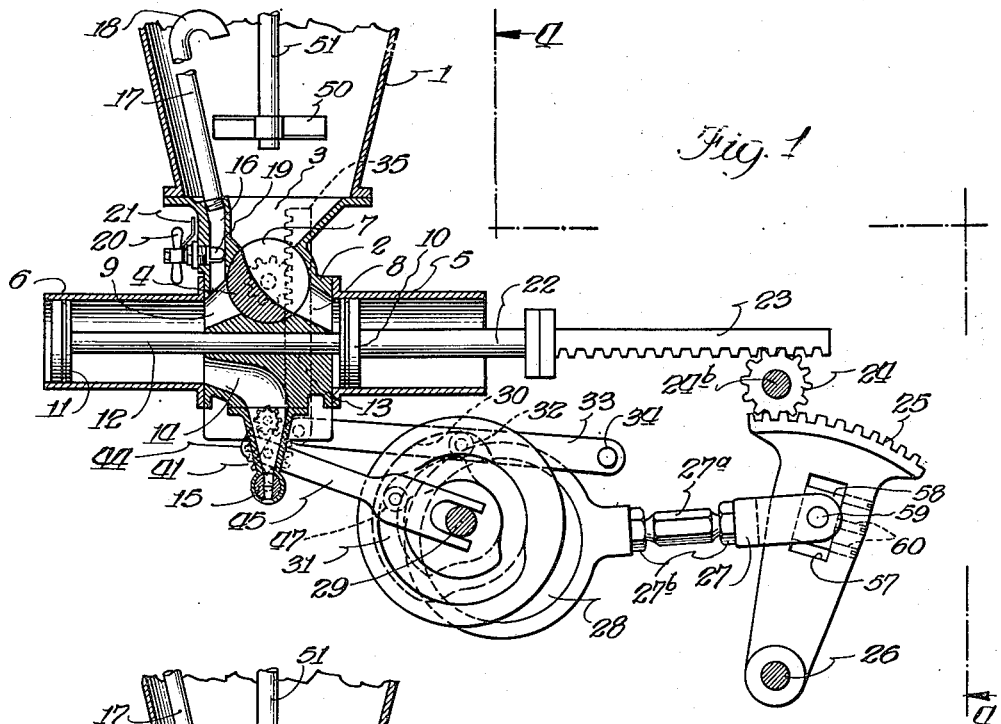

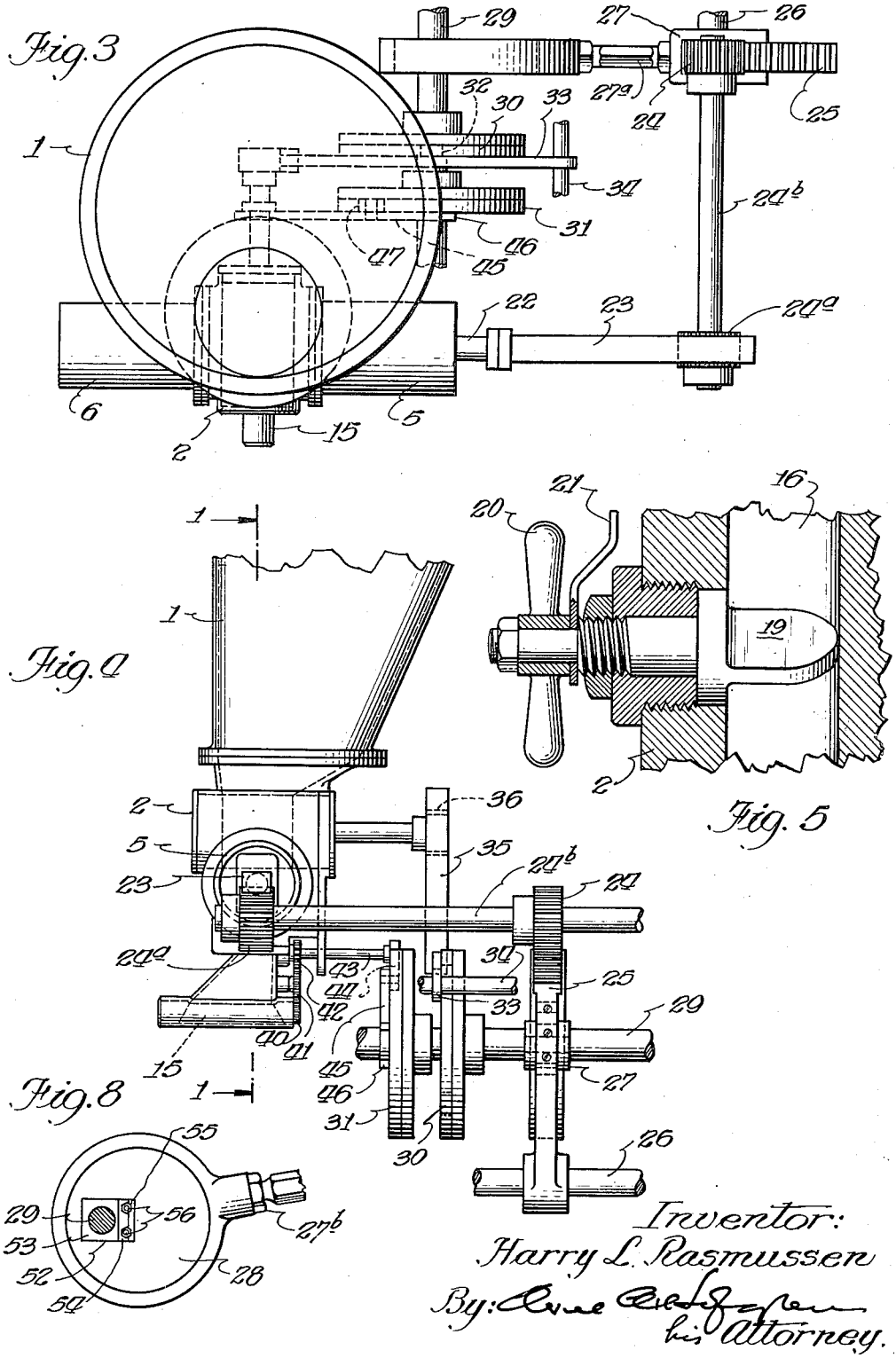

2,315,162

UNITED STATES PATENT OFFICE 2,315,162

MEASURING AND DISPENSING MACHINE

Harry L. Rasmussen, Chicago, Ill.

Application January 9, 1941, Serial No. 373,719

19 Claims. (Cl. 221—103)

This invention relates to means for feeding or dispensing a plastic material such as ice cream, toothpaste, lubricating grease and like materials, particularly in filling cartons, tubes or other containers employed as commercial packages.

One object of the invention is to provide an improved apparatus for withdrawing limited, uniform unit quantities of such material from a larger supply.

Another object is to provide means for accurately limiting the unit quantity of material withdrawn by each operation.

A further object is to provide a regulating device by which the actual quantity of material in each unit dispensed may be varied.

More specifically, it is an object to include means for changing the pressure under which each unit quantity of the material is accumulated preparatory to discharge into the container or package.

These objects are accomplished by providing a receptacle or hopper, a measuring chamber and a transfer or feeding chamber, together with valve means arranged to connect the hopper with the transfer chamber and then to connect the transfer chamber with the measuring chamber so that the material can be first drawn into the feeding chamber from the hopper and then expelled from the feeding chamber into the measuring chamber which determines the quantity to be ejected or dsipensed as the final step in the cycle of operations.

Other objects and advantages will appear from the following description taken in conjunction wtih the accompanying drawings in which:

Figure 1 is a vertical sectional view showing a portion of a hopper and other measuring and dispensing apparatus embodying this invention, the control valve being shown in position for connecting the hopper with the feed cylinder, and section being taken at line 1—1 on Figure 4.

Figure 2 is a similar vertical sectional view but showing the parts at a different stage in the cycle, with the control valve connecting the feed cylinder with the measuring cylinder.

Figure 3 is a top plan view of the apparatus.

Figure 4 is an end view looking in the direction of the arrows 4—4 on Figure 1.

Figure 5 is a detail section on an enlarged scale showing a metering valve.

Figure 6 is a detail elevation of the eccentric with the shaft in section and showing a stroke adjusting device.

Figure 7 is a detail section of the stroke adjusting device on a larger scale taken as indicated at line 7—7 on Figure 6.

Figure 8 is a view similar to Figure 6 but showing the adjusting device set to provide a different stroke.

Although I have shown in the drawings and shall herein describe a single, preferred form of the invention, I do not intend to limit the invention to the particular form shown but aim to cover all modifications and alternative constructions coming within the spirit and scope of the appended claims.

In the preferred embodiment of the invention illustrated in the drawings a hopper 1, of any suitable capacity, is mounted upon a head block 2 which may be supported in a fixed position by any convenient means, not shown. A passage 3, leading downwardly in the head block 2, serves as an outlet for the hopper and is controlled by a cylindrical valve 4 which is rotatable through a limited angle in the head 2. Secured to opposite sides of the head block are a feeding chamber 5 and a measuring chamber 6, both preferably of cylindrical form and mounted with their axes in alignment. The port 7 which extends through the valve member 4 is so formed that at one position of the valve, as seen in Figure 1, it connects the hopper outlet 3 with a feed passage 8 leading into the end of the feeding cylinder 5 which is adjacent the head block 2; and at another position of the valve, as illustrated in Figure 2, its port 7 connects the feed passage 8 with an inlet passage 9 leading into the measuring cylinder 6. The cylinder 5 is provided with a piston 10, and the cylinder 6 is fitted with a piston 11, and, as shown, these pistons are coupled together by a common piston rod 12 mounted to reciprocate in a bearing 13 in the head block 2. At the same end of the measuring cylinder to which the inlet passage 9 leads there is formed in the head block 2 a discharge passage 14 controlled by a valve 15.

With the valve 4 positioned as shown in Figure 1, the piston 10 is moved away from the head block 2, thus creating a suction in the cylinder 5 which, aided somewhat by gravity acting on the plastic material in the hopper 1, acts to draw said material into the cylinder 5, so that upon completion of the piston stroke in this direction, the cylinder 5 and also the port 7 and the feed passage 8 are filled with the material. The valve 4 is then rotated to the position shown in Figure 2, and the piston 10 is moved in the opposite direction,—that is, toward the head block 2. The plastic material in feed cylinder 5 is thus forced out of said cylinder through the passage 8, port 7, and inlet passage 9 into the measuring cylinder or chamber 6, the piston 11 in that chamber moving away from the inlet 9 by virtue of its connection to the piston 10 through the piston rod 12, and thus providing space in the cylinder 6 to receive the material.

At the end of the stroke the valve 4 is shifted back to its former position, as shown in Figure 1, shutting off the cylinder 6 from the cylinder 5 and connecting cylinder 5 with the hopper 1. The piston movement is again reversed, so that as piston 11 moves toward the head 2 it expels the material from the cylinder 6 through the discharge passage 14 and outlet valve 15 which is opened for this portion of the cycle. Simultaneously, the piston 10, traveling away from the head 2, draws a new charge of material into the cylinder 5. It will be understood that during each stroke of the piston 11 by which it discharges material from the cylinder 6 through the valve 15, a suitable carton or other container will be registered at the outlet side of the valve to receive the measured quantity of material; if desired, the containers may be fed into position automatically, as by a conveyor mechanism, not shown.

To insure that a full measure of material is supplied to the cylinder 6 at each feeding stroke of the piston 10, the displacement of this piston 10 is made somewhat greater than that of piston 11. This is accomplished by making the diameter of the cylinder 5 greater than that of the cylinder 6 by five to twenty-five percent, depending upon the material to be handled, so that during its transfer from the feeding cylinder 5 to the measuring cylinder 6 the material is placed under a pressure which serves to compact it and to close up any voids which may be present in the supply coming from the hopper 1. This pressure is limited and regulated by means of an escape passage 16, leading from the upper side of the inlet passage 9 and connecting with a return pipe 17 having a downwardly bent spout 18 through which any excess material is returned to the hopper 1. A valve 19 in the escape passage 16 is adjustable to restrict and control the flow therein by the proper amount to produce a back pressure which will insure the desired degree of packing of the material as it is forced into the measuring chamber 6. An adjusting handle 20 is provided for the valve 19 outside the head block 2, and an index member 21 may be secured to the stem of the valve to traverse a suitable scale (not shown) on the external surface of the head block.

Mechanism for reciprocating the pistons 10 and 11 is shown as including a drive rod 22, connected to the pistons and provided with an extension in the form of a toothed rack 23 meshing with a gear 24ᵃ fixed on the same shaft 24ᵇ with an idler gear 24 which, in turn, meshes with a gear segment 25. The segment is mounted for oscillation about a fixed bearing 26 and is driven by a pitman 27 actuated by an eccentric 28 on a power shaft 29, which may rotate continuously in one direction. To insure actuation of the valves 4 and 15 in timed relation to the movements of the pistons 10 and 11, the shaft 29 carries cams 30 and 31 which control the opening and closing of valves 4 and 15 respectively. The cam groove 30 engages a follower roller 32 on a lever arm 33 which has a fixed fulcrum bearing at 34 and is connected at its free end to a rack bar 35 meshing with a toothed pinion 36 on one end of the cylindrical valve member 4. This valve is thus rocked intermittently from the position shown in Figure 1 to that shown in Figure 2 and back again, at the end of each piston stroke, the cam groove 30 being shaped to effect a relatively quick movement of the valve from one position to the other.

The discharge valve 15 is provided with a gear 40 meshing with an idler gear 41 which is driven by another gear 42 on a shaft 43 extending from one side of the machine and carrying a rocker arm 44 pivotally connected to a link 45. This link has a forked or slotted end portion 46 guided on the shaft 29 and a follower roller 47 engaging in the cam groove 31 so that as the shaft rotates the link 45 and rocker arm 44 are actuated to open and close the valve 15 in correctly timed relation to the motion of the other parts. The pitman 27 includes a member 27ᵃ which has right and left hand threads at its opposite ends for connection with the terminal portions of the pitman and which is provided with lock nuts 27ᵇ so that the effective length of the pitman can be accurately adjusted to determine the positions at which the piston movements will be reversed in relation to the movements of the valves.

The drive connection may also be made adjustable for altering the feeding capacity of the stroke. As shown in Figures 6 to 8, the eccentric 28 is formed with a rectangular opening 52 in which there is fitted a block 53 secured fast to the shaft 29. The remainder of the opening 52 is occupied by a pair of wedge blocks 54 and 55 slidably adjustable upon each other and fitted with clamping bolts 56 by which they may be tightened in position. When the block 53 is disposed in the position shown in Figure 6 the eccentric 28 has a comparatively short stroke which may be calculated to deliver a minimum quantity of material, for example, two pounds, with each reciprocation of the piston 11. But the parts may also be arranged as shown in Figure 8, with the block 53 and the shaft 29 at a greater distance from the center of the eccentric 28, thus giving the latter a greater throw for delivering a larger quantity of material, for example, five pounds, at each reciprocation of the piston 11. For close and final adjustment of the stroke with either arrangement of the block 53, the segment 25 is formed with a rectangular slot 57 in which there is secured a block 58 carrying the pivot 59 which connects the pitman 27 to the segment 25. The block 58 may be secured at any position of adjustment in the length of the slot 57 by means of set screws 60, and it will be evident that by shifting this block 58 in one direction or the other the effective radius at which the pitman 27 is coupled to the segment 25 will be varied, and the travel of the segment teeth will thus be adjusted to give the rack 23 and the pistons 10 and 11 exactly the stroke desired for delivering a determined quantity of material.

It is expected that the materials which this machine is designed to feed and dispense will be in a plastic, somewhat fluid state, and in fairly homogeneous condition, but with some products or compounds it may be desirable to provide an agitator such as that indicated at 50 carried by a shaft 51 in the hopper 1 and arranged to be rotated either manually, or otherwise, by any suitable connections, not shown. The drawings are somewhat diagrammatic in that those portions of the machine frame or base which serve to support the shafts 29 and 24ᵇ and the fulcrum shafts 26 and 34, are omitted for the sake of clearness, but the design and arrangement of such supporting structure will be readily apparent to those skilled in the art.

I claim as my invention:

1. In combination, a hopper, a feed chamber and a measuring chamber, valve means adjustable to connect the feed chamber alternatively with the hopper and with the measuring chamber, and means operable to transfer material forcibly from the feed chamber to the measuring chamber while said feed chamber is disconnected from the hopper, the volumetric capacity of the measuring chamber being less than that of the feed chamber, and said measuring chamber having an escape passage with a restricted outlet for creating a pressure under which the material is accumulated in the measuring chamber.

2. In combination, a hopper, a feed chamber and a measuring chamber, valve means adjustable to connect the feed chamber alternatively with the hopper and with the measuring chamber, and means operable to transfer material forcibly from the feed chamber to the measuring chamber while said feed chamber is disconnected from the hopper, the volumetric capacity of the measuring chamber being less than that of the feed chamber, and said measuring chamber having an escape passage with a restricted outlet for creating a pressure under which the material is accumulated in the measuring chamber, and a valve adjustable to vary the restricted outlet for regulating the weight of the unit quantity accumulated in the measuring chamber.

3. In combination, a hopper having an outlet, a valve controlling said outlet, a feeding cylinder and a measuring cylinder, a piston in the feeding cylinder, said feeding cylinder having a feed passage at one end, the measuring cylinder having an inlet passage and said valve being adjustable to one position with its port connecting the hopper outlet with the passage leading to the feeding cylinder and adjustable to another position with said port connecting said passage with the inlet to the measuring cylinder, and means to reciprocate the piston in the feeding cylinder away from its said passage when the cylinder is connected with the hopper and toward said passage when the valve port completes the connection between the cylinders.

4. In combination, a hopper having an outlet, a valve controlling said outlet, a feeding cylinder and a measuring cylinder each provided with a piston, said feeding cylinder having a feed passage at one end, the measuring cylinder having an inlet passage and a discharge passage both at the same end of the cylinder, and said valve being adjustable to one position with its port connecting only the hopper outlet with the feed passage leading to the feeding cylinder and adjustable alternatively to a position with said port connecting said feed passage only with the inlet to the measuring cylinder, together with means operable to reciprocate the pistons simultaneously and actuating the valve in timed relation thereto, the piston in the measuring cylinder moving away from the inlet passage while the other piston moves toward the said feed passage when the valve is adjusted to the latter position.

5. In combination, a hopper having an outlet, a valve controlling said outlet, a feeding cylinder and a measuring cylinder each provided with a piston, said feeding cylinder having a feed passage at one end, the measuring cylinder having an inlet passage and a discharge passage both at the same end of the cylinder, and said valve being adjustable to one position with its port connecting only the hopper outlet with the feed passage leading to the feeding cylinder and adjustable alternatively to a position with said port connecting said feed passage only with the inlet to the measuring cylinder, together with means operable to reciprocate the pistons simultaneously and actuating the valve in timed relation thereto, the piston in the measuring cylinder moving away from the inlet passage while the other piston moves toward the said feed passage when the valve is adjusted to the latter position, said piston in the measuring cylinder moving toward its discharge passage when the valve is shifted to its first mentioned position.

6. In combination, a hopper, a feeding cylinder and a measuring cylinder each provided with a piston, said pistons being axially aligned and connected by a common piston rod whereby they reciprocate in unison in their respective cylinders, valve means adjustable to connect the feeding cylinder alternatively with the hopper and with the measuring cylinder, the diameter of the feeding cylinder being greater than that of the measuring cylinder whereby the material is compressed in the measuring cylinder, and a restricted escape passage which receives the material under such compression.

7. In combination, a hopper, a feed cylinder and a measuring cylinder, valve means adjustable to connect the feeding cylinder alternatively with the hopper and with the measuring cylinder, and a piston reciprocable in said feeding cylinder to admit material from the hopper and to expel said material into the measuring cylinder, together with a piston reciprocable in the measuring cylinder to discharge the material therefrom, said measuring cylinder having an outlet passage and a valve controlling said outlet automatically operated in timed relation to the movement of the piston.

8. In combination, a hopper, a feed cylinder and a measuring cylinder, a control valve adjustable to connect the feeding cylinder alternatively with the hopper and with the measuring cylinder, a piston reciprocable in said feeding cylinder to admit material from the hopper and to expel said material into the measuring cylinder, a piston reciprocable in the measuring cylinder to discharge the material therefrom, said measuring cylinder having an outlet and a valve controlling said outlet, together with a common drive shaft connected for reciprocating the pistons and having cams with linkage by which said cams actuate the control valve and the outlet valve respectively in timed relation to the piston movements.

9. In combination, a hopper, a feeding cylinder and a measuring cylinder each provided with a piston, said pistons being axially aligned and connected by a common piston rod whereby they reciprocate in unison in their respective cylinders, valve means adjustable to connect the feeding cylinder alternatively with the hopper and with the measuring cylinder, the diameter of the feeding cylinder being greater than that of the measuring cylinder whereby the material is compressed in the measuring cylinder, and a restricted escape passage which receives the material under such compression, together with means adjustable to control the capacity of said escape passage for adapting the device to materials of different density.

10. In combination, a hopper, a feed chamber and a measuring chamber, valve means adjustable to connect the feed chamber alternatively with the hopper and with the measuring chamber, and means operable to transfer material forcibly from the feed chamber to the measuring chamber while said feed chamber is disconnected from the hopper, the volumetric capacity of the measuring chamber being less than that of the feed chamber, and said measuring chamber having an escape passage with a restricted outlet of variable capacity for creating a pressure under which the material is accumulated in the measuring chamber and controlling such pressure relatively to the density of the material.

11. In combination, a hopper, a feed chamber and a measuring chamber, valve means adjustable to connect the feed chamber alternatively with the hopper and with the measuring chamber, and means operable to transfer material forcibly from the feed chamber to the measuring chamber while said feed chamber is disconnected from the hopper, the volumetric capacity of the measuring chamber being less than that of the feed chamber, and said measuring chamber having an escape passage with a restricted outlet for creating a pressure under which the material is accumulated in the measuring chamber, said escape passage having an outlet discharging into the hopper.

12. In combination, a hopper, a feeding cylinder and a measuring cylinder each provided with a piston, said pistons being axially aligned and connected by a common piston rod whereby they reciprocate in unison in their respective cylinders, a control valve having a port adjustable to connect the feeding cylinder alternatively with the hopper and with the measuring cylinder, said measuring cylinder having an outlet passage and a valve controlling said outlet, and a common drive shaft providing a crank motion for reciprocating the pistons and having cams with linkage by which said cams are connected to actuate the control valve and the outlet valve respectively in timed relation to the piston movements.

13. In a measuring and dispensing machine, a head block, a hopper surmounting said head block, a feed cylinder and a measuring cylinder secured respectively to opposite sides of the head block in axial alignment, a control valve rotatably mounted in the head block and having a transverse port, said head block having an outlet passage leading from the hopper, a feed passage communicating with the feeding cylinder and an inlet passage communicating with the measuring cylinder, said valve being adjustable for positioning its port to connect the hopper outlet with said feed passage and alternatively adjustable with its port connecting the feed passage to the inlet passage, a piston in each of said cylinders with a common piston rod connecting them and extending through a bearing in the head block, said head block having also an outlet passage communicating with the measuring cylinder and a discharge valve controlling the flow of material from said passage, together with means for reciprocating the pistons and actuating said valves in timed relation thereto.

14. In combination, a hopper, a feed cylinder and a measuring cylinder, valve means adjustable to connect the feeding cylinder alternatively with the hopper and with the measuring cylinder, and a piston reciprocable in said feeding cylinder to admit material from the hopper and to expel said material into the measuring cylinder, together with a piston in the measuring cylinder operable to discharge the material therefrom, driving means having a uniform movement, and a connection therefrom arranged to actuate said piston and adjustable at will to alter the stroke of said piston for changing the measured quantity discharged at each stroke.

15. In combination, a hopper, a feed cylinder and a measuring cylinder, valve means adjustable to connect the feeding cylinder alternatively with the hopper and with the measuring cylinder, and a piston reciprocable in said feeding cylinder to admit material from the hopper and to expel said material into the measuring cylinder, together with a piston in the measuring cylinder operable to discharge the material therefrom, and driving means for said piston including a rotary drive shaft with an eccentric secured on the shaft with capacity for adjustment transversely of the shaft axis to vary the eccentricity of the eccentric and the resulting stroke of the piston for discharging a desired quantity of material from the measuring cylinder at each stroke.

16. In combination, a hopper, a feed cylinder and a measuring cylinder, valve means adjustable to connect the feeding cylinder alternatively with the hopper and with the measuring cylinder, and a piston reciprocable in said feeding cylinder to admit material from the hopper and to expel said material into the measuring cylinder, together with a piston in the measuring cylinder operable to discharge the material therefrom, and driving means for said piston including a rotary drive shaft providing a crank motion, a rockable gear segment, a pitman actuated by the shaft and a pivot connecting the pitman to the segment, said pivot being mounted for adjustment radially on the segment for varying the effective stroke transmitted by the segment to the piston in the measuring cylinder.

17. In combination, a hopper, a feed cylinder and a measuring cylinder, valve means adjustable to connect the feeding cylinder alternatively with the hopper and with the measuring cylinder, a piston reciprocable in said feeding cylinder to admit material from the hopper and to expel said material into the measuring cylinder, a piston in the measuring cylinder operable to discharge material therefrom, driving means having a uniform movement, and a connection therefrom arranged to actuate both pistons simultaneously and adjustable at will to alter the stroke imparted to said pistons for changing the measured quantity discharged at each stroke.

18. In combination, a hopper, a feeding cylinder, and a measuring cylinder, with a passage connecting the hopper with the feeding cylinder and a passage connecting the feeding cylinder with the measuring cylinder, together with a piston reciprocable wholly within the feeding cylinder, and a valve device mechanically connected with the piston and actuated in timed relation therewith, said valve device closing the said passages alternately and during opposite strokes of the piston respectively.

19. In the combination defined in claim 18, a second piston, reciprocable in the measuring cylinder, and means operating it in timed relation with the first piston and in a direction to discharge material from said measuring cylinder while the feeding cylinder is connected with the hopper.

HARRY L. RASMUSSEN.